Figure 1:
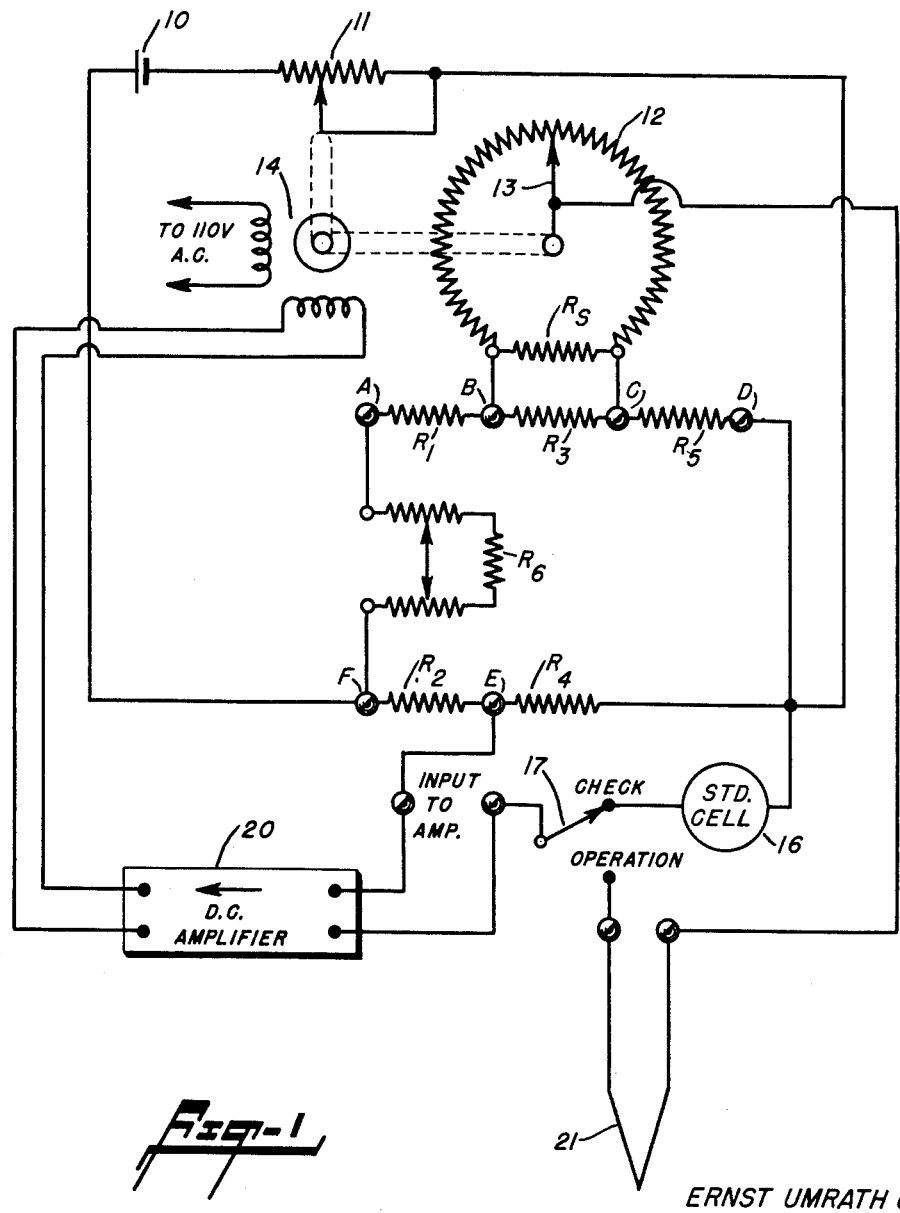

March 20, 1956 E. UMRATH ET AL 2,739,271
TERMINAL BOARD FOR POTENTIOMETRIC RECORDER
Filed Oct. 28, 1952 2 Sheets-Sheet 1

ERNST UMRATH and
HUBERT FLINN
INVENTORS

BY
ATTORNEYS

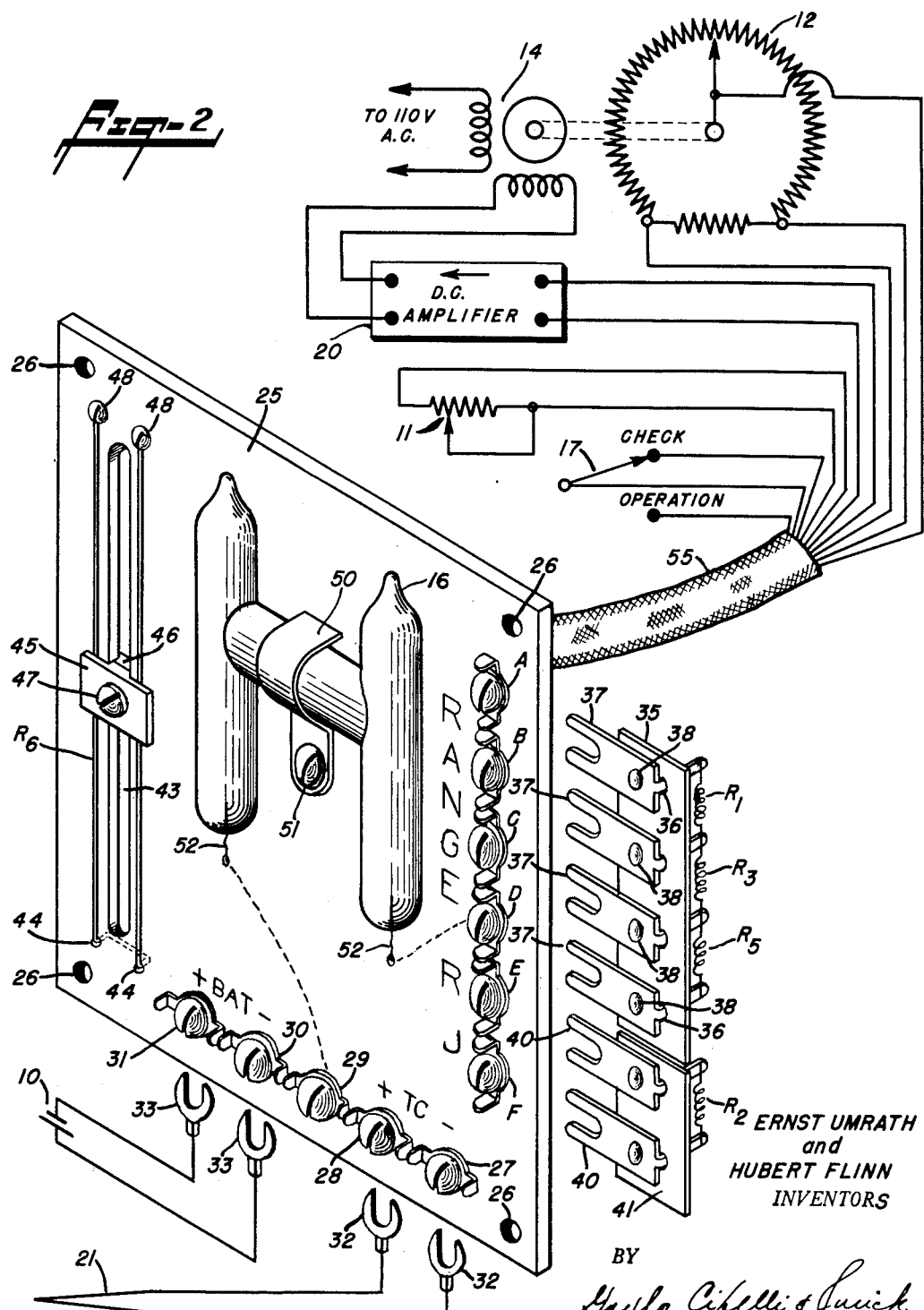

United States Patent Office 2,739,271
Patented Mar. 20, 1956

2,739,271

TERMINAL BOARD FOR POTENTIOMETRIC RECORDER

Ernst Umrath, Bloomingdale, N. J., and Hubert Flinn, New York, N. Y., assignors to Weston Electrical Instrument Corporation, Newark, N. J., a corporation of New Jersey Application October 28, 1952, Serial No. 317,195

5 Claims. (Cl. 317—99)

This invention relates to improvements in automatic indicating and/or recording apparatus and more particularly to the novel construction, arrangement and assembly of components forming a part of the measuring system of a potentiometric recorder, to thereby facilitate the production and servicing of such device.

Recorders of the type to which this invention relates are useful in providing a measurement and record of a varying condition such as, for example, temperature. The indication and recording of the instantaneous state of the varying condition is accomplished by a normally-balanced electrical network which is adapted to be unbalanced by a variation of the condition from a preselected normal value. An unbalance in the network effects the operation of a suitable rebalancing means and the simultaneous energization of a suitable power means for moving an indicating pointer and/or an inking pen over a calibrated chart. In the case of a thermocouple recorder the electrical network is of the potentiometer type wherein the electromotive force generated by the thermocouple is balanced against, or compared with, a known reference potential. Such balance method of measurement depends for its accuracy upon the establishment and maintenance of precise, predetermined circuit constants which are related to the characteristics of the particular thermocouple and the operating range of the recorder. Further, since the electromotive force generated by the thermocouple is determined by the actual temperature difference between its hot and cold junctions, some means must be provided to compensate for temperature changes effective at the couple cold-end or reference-junction. This usually is accomplished by inserting into the electrical network a coil of wire made of an alloy having a resistance-temperature characteristic such that its ohmic resistance varies in precise accordance with the voltage changes of the particular thermo-couple upon cold-end temperature changes. Such cold-end compensating coils are made of a nickel alloy and the temperature-coefficient of such alloys varies from batch to batch of the material. These critical requirements have heretofore made it necessary to assemble and adjust recorders on an individual basis and necessitates the return of the device to the factory in the event one or more of the critical components of the measuring system had to be replaced or the operating range of the device changed from its original factory setting.

An object of this invention is the provision of a potentiometric recorder wherein the critical components of the electrical measuring network comprise individual elements removably connected into the network thereby facilitating the manufacture, servicing and repair of the device.

An object of this invention is the provision of a terminal board for a potentiometric recorder, said board comprising a panel having an elongated opening, a resistance wire secured to the panel and extending along opposite sides of the opening, a metallic slider operable in said opening and engaging the oppositely-disposed portions of the wire, means securing the slider in fixed position relative to the panel, a standard cell carried by the panel, and a plurality of resistance elements removably connectable to terminals carried by the panel.

These and other objects and advantages will be apparent from the following description when taken with the accompanying drawings. The drawings are for purposes of illustration and are not to be construed as defining the scope or limits of the invention, reference being had for the latter purpose to the appended claims.

In the drawings, wherein like reference characters denote like parts in the several views:

Figure 1 is a circuit diagram of the measuring network of a potentiometric recorder; and Figure 2 is an isometric view of the terminal board.

Reference is now made to Figure 1. The measuring portion of the system comprises a battery 10 (usually a dry cell) a battery rheostat 11 and a bridge network that includes the fixed resistors $R_1$–$R_6$ and a circular slide wire rheostat 12 having a rotary contact arm 13 mechanically coupled to a motor 14. The shunt resistor $R_s$ is connected directly across the ends of the rheostat 12 and is adjusted at the factory so that the overall effective resistance of such slide wire rheostat is set to a precise, predetermined ohmic value. Consequently, all such rheostats will have the same resistance value, whereby the rheostats are made interchangeable in any recorders made in accordance with this invention. Those skilled in this art will understand that the voltage appearing across the bridge resistor $R_4$ depends upon the voltage of the battery 10 and the setting of the rheostats 11 and 12. Also, the rotary arm 13, of the rheostat 12, is mechanically coupled to a suitable mechanism for properly driving an inking pen over a calibrated chart.

In order to adjust the voltage across the bridge network to a proper value there is provided a conventional checking circuit comprising the rheostat 11, the single-pole, double-throw switch 17, the standard cell 16 and the fixed resistor $R_4$, the latter having an adjusted, ohmic value such that with a given current flowing therethrough, say 5 milliamperes, the potential drop across such resistor is equal to the voltage of the standard cell. When the switch 17 is closed in the Check position the voltage of the standard cell bucks the potential drop across the resistor $R_4$. If both of these voltages are equal no current will flow in input loop of the amplifier 20 and the bridge circuit is said to be standardized. If, however, the voltage drop across the resistor $R_4$ is higher or lower than the voltage of the standard cell, a current will flow in the amplifier loop, such current having a direction and magnitude depending upon the condition of unbalance. The amplifier drives the balancing motor 14. As is well known in this art, the movable arm of the battery rheostat 11 is coupled to the motor armature when the switch 17 is closed in the Check position; such coupling arrangement forming no part of the present invention it is not included in the drawing. The arm of the rheostat 11 is moved in one direction or the other until the potential drop across the resistor $R_4$ is exactly equal to the voltage of the standard cell, whereupon the bridge is standardized and the apparatus is in proper condition for measuring purposes. The thermocouple 21 is susbtituted for the standard cell 16 in the bridge network by closure of the switch 17 to the Operation position. Those skilled in this art will understand that the electromotive force generated by the thermocouple will unbalance the bridge network and produce rotation of the motor 14 in one direction or the other until the position of the rheostat arm 13 is such that the voltage drop across the resistor $R_4$ is again brought to a zero.

The above-described circuit is of conventional character. However, in order to facilitate the production and servicing of the recorder and particularly to facilitate changing the recorder operating range, we mount the critical components of the electrical network on a terminal board whereby desired components can be changed with a maximum of convenience. In order to relate the critical components of the Figure 1 circuit diagram to the structural arrangement of Figure 2, attention is directed to the screw type connection terminals identified by the letters A–F, inclusive, in both figures. The critical components which effect the constants of the measuring circuit and, therefore, the operation of the recorder, are the bridge network, resistors $R_1$ to $R_6$, inclusive.

Referring now to Figure 2, the terminal board consists of a flat panel 25, made of a suitable insulating material such as a plastic, provided with the four mounting holes 26 whereby the panel may be secured to suitable studs disposed within the recorder case. In addition to the screw type connection terminals A–F, the panel carries similar terminals 27–31. The leads of the thermocuple 21 are provided with lugs 32 having forked ends and adapted for connection to the screw terminals 27, 28, and the leads of the dry cell battery 10 are provided with similar lugs 33 for connection to the screw terminals 30, 31, thereby facilitating the substitution of different thermocouples and the replacement of the battery.

Inasmuch as the ohmic value of the slide wire rheostat 12, shown in Figure 1, is set to a predetermined value by means of the associated shunt resistor $R_s$, the operating range of the recorder is determined by the ohmic values of the bridge resistors $R_1$, $R_3$ and $R_5$. Therefore, to facilitate changing the range of a given recorder we mount the three resistors $R_1$, $R_3$ and $R_5$ as a unit on a suitable insulator strip. As shown in Figure 2, such insulator strip 35 is provided with four holes 36. Four, flat lugs 37 are secured to the strip, as by the rivets 38, each lug having an integral, offset end passing through one of the holes 36. The accurately adjusted resistors $R_1$, $R_3$ and $R_5$, here shown in the form of coils, are soldered to the offset ends of the lugs, as shown. In actual practice all resistors are sealed within a suitable protective medium. The lateral spacing of the lugs 37 corresponds to the spacing of the screw terminals A–D, carried by the panel 25, whereby the resistors can be connected to the terminal board as a unit. The value of the resistor $R_4$, Figure 1, is constant for all ranges of the recorder and such resistor is, therefore, disposed on the back of the panel and soldered to the appropriate screw terminals.

Since the electromotive force generated by a thermocouple is determined by the temperature difference between the hot and cold junctions, it is necessary to provide some means to compensate the network for temperature changes effective at the cold-end, or reference-junction, of the couple. This is done by inserting into the electrical bridge network a coil of wire made of an alloy having a temperature-resistance coefficient such that the ohmic changes of the coil will maintain a bridge balance upon changes in the electromotive force of the thermocouple with temperature variations of the couple reference-junction. The resistor $R_2$, Figure 1, is such compensating resistor. Alloys suitable for this purpose are known as nickel alloys and the characteristics of such alloys vary from batch to batch of the material. In order to further promote the standardized, interchangeable character of the critical components of the measuring network we prefer to make all of the resistors $R_2$ of a predetermined constant resistance value and to vary the nickel content of the alloy in order to obtain the required amount of compensation for thermocouples made of specific materials. Once groups of such compensating resistors have been produced for use with various specific thermocouple materials they can be marked accordingly. Thus, if the measuring network initially has been set up for operation with an iron-constantan thermocouple the change to a copper-constantan thermocouple requires only the replacement of the original $R_2$ resistor with one marked for use with copper-constantan couples. As shown in Figure 2, the compensating resistor $R_2$ is soldered to the offset ends of the flat lugs 40 secured to the insulator strip 41. The lugs 40 are spaced for insertion under the screw terminals E and F, carried by the terminal board, thereby facilitating the substitution of such resistors for the purpose just described.

The panel 25 includes an elongated opening 43 and the small holes 44. Slidable along such opening is a slide contact made of two substantially-identical metal pieces 45, 46 each piece having a central, rectangular boss section that fits nicely within the opening, as shown. The front piece 45 has a clearance hole accommodating the screw 47 and the rear piece 46 is provided with a cooperating, threaded hole. When the screw 47 is loosened the slide contact can be moved up and down to a desired position and a tightening of the screw will retain the slide contact in fixed position on the panel. Referring for the moment to Figure 1, the electrical zero of the measuring network can be set by adjustment of the variable resistor $R_6$. In Figure 2 this resistor is shown as a wire ($R_6$) having its ends secured by the screws 48 and passing through the panel holes 44. The greatest portion of such wire is disposed on the front of the panel on opposite sides of the elongated opening 43, so that oppositely-disposed positions of the wire are clamped between the panel and the slide contact. It will be apparent that the relatively minor resistance adjustment which may be necessary to establish the electrical zero position of a given recorder can be made by setting the slide contact to short out more or less of the resistor $R_6$, that is by moving the slide contact down or up along the opening.

The standard cell 16 is removably secured to the panel 25, as by the clamp 50 and srew 51, and the terminal leads 52 pass through suitable holes in the panel and are soldered to the terminals D and 29, as shown.

The necessary wiring required to connect the removable components into the electrical circuit and including the resistor $R_4$, is done on the back of panel 25 and appropriate, color-coded leads, in the form of a flexible cable 55, are run to the other electrical components associated with the network, as shown. It may here be pointed out that the terminal board is positioned within the recorder case so as to afford easy access thereto.

Having now described the invention it is apparent our arrangement affords heretofore unobtainable manufacturing economy in the production of recorders having a variety of operating ranges and characteristics, greatly simplifies the normal maintenance of such recorders, and makes possible the modification or alteration of a given recorder in the field.

What we desire to protect by Letters Patent of the United States is set forth in the following claims.

We claim:

1. A terminal board for a potentiometric recorder of the type including a plurality of resistors and a reference-junction compensating resistor, comprising a panel of insulating material; a first and a second set of screw terminals carried by the panel; a first insulator strip carrying spaced forked connection terminals adapted for mechanical and electrical connection to the first group of screw terminals; resistance elements connected to the terminals carried by the first insulator strip, a second insulator strip carrying forked terminals adapted for mechanical connection to the second group of screw terminals; a reference-junction compensating resistor connected to the terminals of the second insulator strip, and a fixed resistor connected across adjacently disposed terminals of the said two sets of screw terminals.

2. A terminal board for a potentiometric recorder, said board comprising a panel of insulating material having an elongated, substantially-rectangular opening therein; a resistance wire having its ends secured to connection terminals of the panel, said wire including portions extending along the front surface of the panel and on opposite sides of said opening, a metallic slider movable within said opening and in electrical contact with portions of said resistance wire disposed on opposed sides of said opening; means securing the slider in fixed position relative to the panel; a plurality of screw type terminals carried by the panel; a plurality of insulator strips carrying spaced forked terminals adapted for connection to the screw-type terminals; a plurality of resistance elements connected across the forked terminals; and a fixed resistor carried by the panel.

3. The invention as recited in claim 2 including a standard cell removably secured to the panel, one side of said cell being connected to one of said screw type terminals.

4. A terminal board for a potentiometric recorder comprising a flat panel of insulating material having an elongated slot therein, a resistance wire having its ends secured to connection terminals carried by the panel, said wire including portions extending along a surface of the panel and on opposite sides of the said slot, a metallic slider slidable within the said slot and including portions in electrical contact with portions of the resistance wire on opposed sides of the slot, means securing the slider in fixed position relative to the panel, clamping means carried by the panel and adapted to removably secure a standard cell thereto, and spaced, screw type connection terminals carried by the panel, said terminals being adapted to receive fork-type terminals for the purpose of making mechanical and electrical connections.

5. A terminal board for a potentiometric recorder comprising a panel of insulating material having an elongated opening, an adjustable resistor mounted thereon comprising a resistance wire with portions spaced on opposite sides of said opening and a slide contact comprising front and rear metal members adjustably secured together and forming a portion slidable in said opening and a portion bridging the distance between said spaced wire portions, clamping means carried by the panel and adapted to removably secure a standard cell thereto, and spaced, screw-type connection terminals carried by the panel and adapted to receive fork-type terminals for making mechanical and electrical connections.

References Cited in the file of this patent

UNITED STATES PATENTS 2,584,897    Marco _____ Feb. 5, 1952